(No Model.)

C. C. DU CRAY.
CORN PLANTER.

No. 381,223. Patented Apr. 17, 1888.

WITNESSES:
Chas. Nida
C. Sedgwick

INVENTOR:
C. C. Du Cray
BY Munn & Co.
ATTORNEYS.

(No Model.) 2 Sheets—Sheet 2.
C. C. DU CRAY.
CORN PLANTER.

No. 381,223. Patented Apr. 17, 1888.

WITNESSES:
Chas. Nida
C. Sedgwick

INVENTOR:
C. C. Du Cray
BY Munn & Co
ATTORNEYS.

UNITED STATES PATENT OFFICE.

CHARLES C. DU CRAY, OF IOWA COUNTY, WISCONSIN, ASSIGNOR TO HIMSELF, AND HARRY J. F. WEBB, OF DUBUQUE, IOWA.

CORN-PLANTER.

SPECIFICATION forming part of Letters Patent No. 381,223, dated April 17, 1888.

Application filed November 19, 1887. Serial No. 255,576. (No model.)

*To all whom it may concern:*

Be it known that I, CHARLES C. DU CRAY, of the county of Iowa and State of Wisconsin, have invented a new and Improved Corn-Planter, of which the following is a full, clear, and exact description.

This invention relates to corn-planters, the main object of the invention being to improve the corn delivering mechanism, to provide for the smoothing of the ground in advance of the wheels, and to provide for the marking off of the adjacent rows as the planter advances, all as will be hereinafter more fully described, and specifically pointed out in the claims.

Reference is to be had to the accompanying drawings, forming a part of this specification, in which similar figures of reference indicate corresponding parts in all the views.

Figure 1:
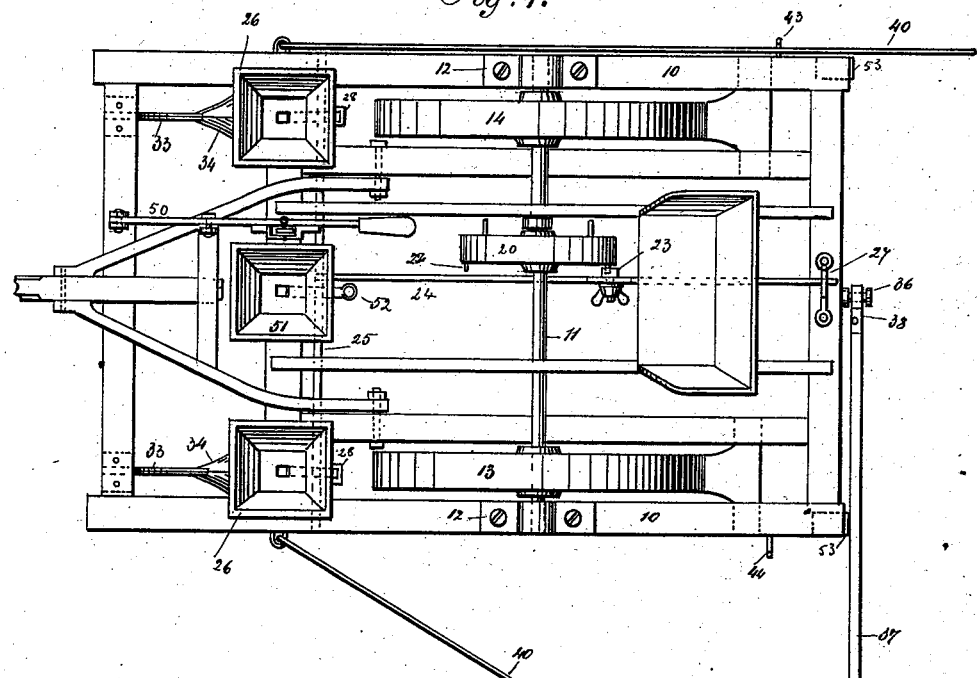
Figure 2:
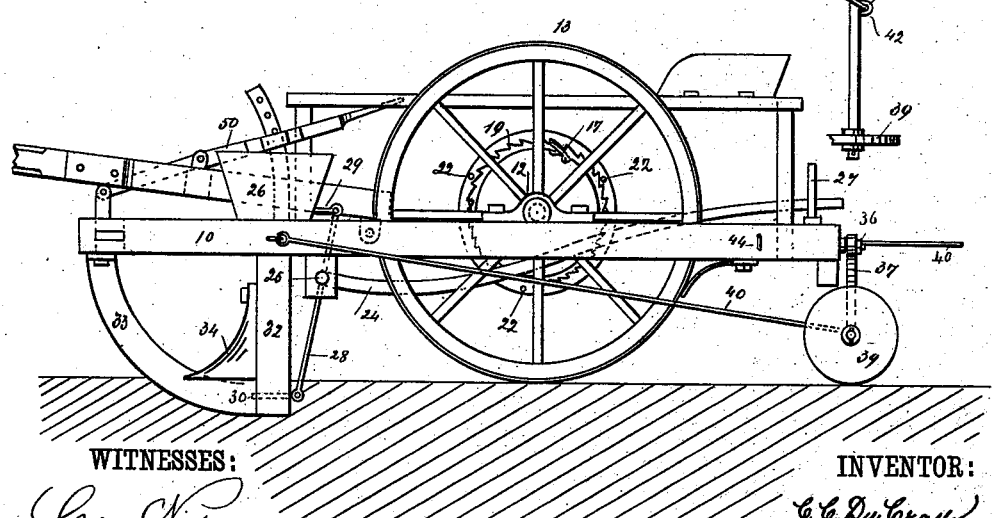
Figure 3:
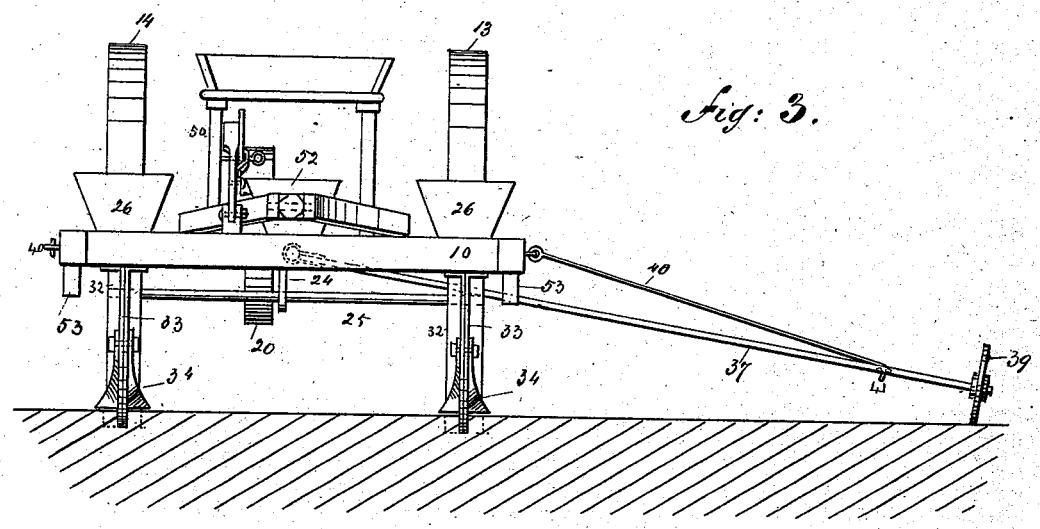
Figure 4:
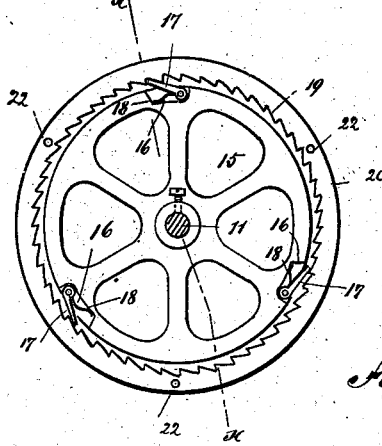
Figure 5:
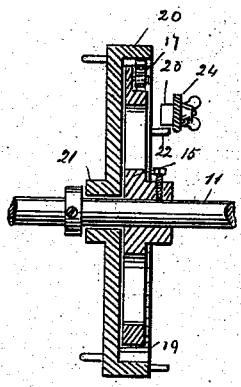
Figure 6:
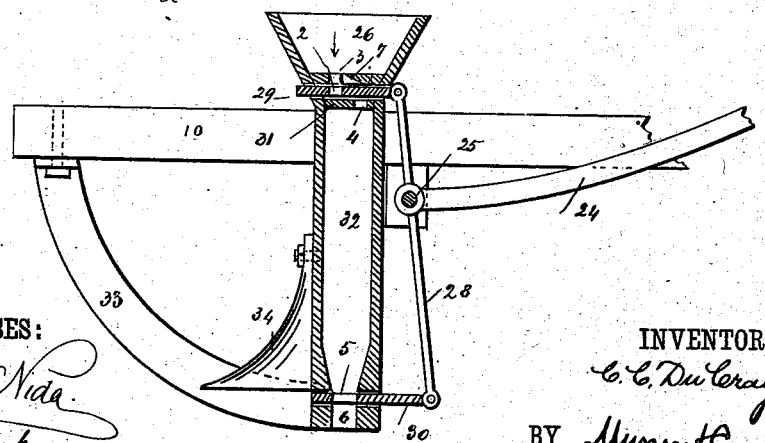

Figure 1 is a plan view of my improved form of planter. Fig. 2 is a side view thereof. Fig. 3 is a front view of the planter. Fig. 4 is a side view of the ratchet-wheel and its connections, the main shaft or axle of the machine being shown in section. Fig. 5 is a sectional view taken on line *x x* of Fig. 4; and Fig. 6 is an enlarged detail view of one of the hoppers and the delivery mechanism arranged in connection therewith, the hopper, the delivery-chute, and the slides being shown in section.

In constructing such a machine as the one illustrated in the drawings above referred to, I provide a rectangular frame, 10, which is supported by the main shaft or axle 11, the frame being provided with bearings or boxes 12, in which the ends of the shaft or axle ride. The shaft or axle 11 carries wheels 13 and 14, one of which wheels is fixed to the shaft, while the other is free to revolve thereon, thus providing for the easy turning of the machine.

Upon the shaft 11, I secure a wheel, 15, in the peripheral edge of which there are recesses 16, in which I mount pawls 17, that are normally forced outward by springs 18, which engage with ratchet-teeth 19, that are formed upon the inner face of a wheel, 20, said wheel being provided with a hub, 21, through which the shaft 11 passes, the hub, however, being loosely mounted upon the shaft. Pins 22 extend outward from the face of the rim of the wheel 20 to bear against an adjustable stop, 23, that is carried by a lever, 24, said lever being rigidly connected to a transverse shaft, 25, that is mounted just to the rear of the hoppers 26, the rear end of the lever 24 being guided within a U shaped loop, 27.

To the shaft 25, I connect levers 28, and to these levers I connect upper slides, 29, and lower slides, 30. The slides 29 are formed with apertures 2, which, when the slides are thrown forward, register with apertures 3, that are formed in the bottoms of the hoppers; but when the slides 29 are drawn backward their apertures 2 will register with apertures 4, that are formed in a partition, 31, which is arranged below the slides and closes the upper end of the seed-delivery troughs 32. The slides 30 work in ways formed at or near the lower ends of the seed delivery troughs, and these slides are provided with apertures 5, which register with a passage, 6, formed below the troughs 32, when the slides 30 are thrown backward, the seed being delivered at this time, as will be hereinafter explained.

In advance of the troughs 32, I arrange the usual form of furrow-openers, 33, and just behind these furrow-openers and about three inches above their lower edges I mount plow-shaped attachments 34, which, as the machine advances, act to smooth the ground in advance of the wheels 13 and 14.

To the rear cross-bar of the frame 10, I connect a bolt, 36, to which there is secured a marker-arm, 37, said arm being provided with a strap, 38, which overlaps the bolt 36. Upon the end of this marker-arm there is mounted a marker-wheel, 39, and upon each side of the machine I secure a brace-rod, 40, each of said brace-rods being provided with a hook, 41, that is adapted to enter an eye, 42, carried by the marker-arm.

From the construction described it will be seen that the marker-arm can be adjusted so as to extend from either side of the machine. In the drawings it is represented as extending from the left side of the machine, while the brace 40 upon the right is represented as being supported by a hook, 43, a similar hook, 44, being provided upon the left-hand side of the machine.

A lever, 50, is arranged so that the forward end of the planter may be raised clear of the ground, any proper construction being employed for this purpose—such, for instance, as the one illustrated in the drawings.

Between the hoppers 26, I arrange a hopper, 51, which is provided with a slide that is operated by a foot-lever, 52, and this hopper I employ as a marker, dropping a few grains of poor corn or beans from the hopper at the end of each row.

In operation, as the machine advances, the pins 22 will strike against the projection 23, that is carried by the lever 24, and the lever will be raised, which movement of the lever will rock the shaft 25 and carry the upper slide, 29, forward and the lower slide, 30, to the rear, this movement serving to clear the passage from the troughs 32. Then, as the pin 22 passes from engagement with the projection 23, the weight of the lever 24 will return it to the position in which it is shown in Fig. 2, and the slides 29 will be carried to the rear, taking with them a supply of corn which has passed downward and into their recesses 2, all splitting of the corn at this time being prevented by spring-tongues or cut-off 7, arranged as illustrated in Fig. 6, and as the recess 2 passes above the opening 4 the corn held therein will pass downward through the trough and on to the slide 30, to be delivered by said slide at the next upward movement of the lever 24.

In practice the pawls 17 should be set as represented in Fig. 4—that is, so that but one of the pawls will engage the ratchet-teeth 19 at the same time, all lost motion being thus avoided, as a very slight turn of the wheel 15 will bring one or the other of the pawls into engagement with the ratchet-teeth. By providing the ratchet-wheel 20 and the pawl-carrying wheel 15, I insure the advance of the wheel 20 as the machine advances; but when the machine is backing the position of the wheel 20 will not be changed, the pawl slipping over the ratchet-teeth.

The marker-arm 37 when in operative position is held against one or the other of downwardly-extending stops 53, this arrangement insuring a rigid support for the said marker-arm.

Having thus fully described my invention, I claim as new and desire to secure by Letters Patent—

1. In a corn-planter, the combination, with a main shaft or axle, of a wheel carried thereby and provided with pins, a transverse shaft, a lever rigidly connected to said shaft and provided with a projection which extends into the path of the pins, a hopper, a seed-delivery trough arranged below the hopper, and a lever provided with seed-delivery slides, one of which is arranged beneath the hopper and the other at the lower portion of the delivery-trough, substantially as described.

2. In a corn-planter, the combination, with a main shaft or axle, of a wheel rigidly connected thereto and provided with pawls, a second wheel loosely mounted thereon and formed with internal ratchet-teeth, with which the pawls engage, pins extending outward from the side of the flange of the ratchet-wheel, a transverse shaft, a lever rigidly connected thereto and provided with a projection which extends into the path of the pins, a hopper, a seed-delivery trough arranged below the hopper, a lever carried by the transverse shaft, and feed-slides connected to the opposite ends of said lever and arranged the one to operate in connection with the hopper and the other in connection with the delivery-trough, substantially as described.

3. The combination, with the axle or shaft having a fixed wheel provided with spring-pawls secured thereon, and a loose wheel mounted on said shaft, having internal ratchet-teeth extending over said fixed wheel and adapted to be engaged by said pawls, and projecting pins extending laterally therefrom, of a transverse rock-shaft journaled in the main frame and provided at each end with vertical arms, said arms having the upper and lower seed-delivering slides arranged to operate alternately in a seed-delivery trough of the hopper, said rock-shaft having a rearwardly-extending lever provided with a stop which extends in the path of the projecting pins on the aforesaid loose wheel, whereby said lever and rock-shaft operate substantially as shown and described.

4. In a corn-planter, the combination of a main frame, 10, carrying the drive axle or shaft 11, said shaft provided with a fixed wheel, 15, having recesses 16, spring-pawls 17, pivoted in said recesses, a loose wheel, 20, having a circumferential flange extending over said wheel 15 and provided with internal ratchet-teeth, 19, and laterally-extending pins 22, and transverse rock-shaft 25, mounted in the frame 10, having the arms 28 connected thereto, said arms having the upper and lower seed-slides, 29 and 30, secured thereto, a rearwardly-extending lever, 24, centrally connected to said rock-shaft and provided with a stop, 23, placed in line of the pins 22 and having its rear end guided in a bail, 27, the hopper 20, having seed-troughs 32, furrow-openers 33, and levelers 34, arranged in front of the troughs 32 above the lower edges of the furrow-openers, all arranged to operate substantially as and for the purpose described.

CHARLES C. DU CRAY.

Witnesses:
M. M. COTHREN,
CYRUS LANYON.